US012687819B2

(12) United States Patent
Xu

(10) Patent No.: US 12,687,819 B2
(45) Date of Patent: Jul. 21, 2026

(54) Timer

(71) Applicant: Zhi Xu, Xianning (CN)

(72) Inventor: Zhi Xu, Xianning (CN)

( * ) Notice: Subject to any disclaimer, the term of this patent is extended or adjusted under 35 U.S.C. 154(b) by 0 days.

(21) Appl. No.: 19/215,757

(22) Filed: May 22, 2025

(65) Prior Publication Data

US 2025/0284247 A1 Sep. 11, 2025

(30) Foreign Application Priority Data

Apr. 24, 2025 (CN) ......................... 202510523194.1

(51) Int. Cl.

| | |
|---|---|
| ***G04F 3/06*** | (2006.01) |
| ***G04G 9/00*** | (2006.01) |
| ***G04G 17/00*** | (2013.01) |
| ***G04G 17/04*** | (2006.01) |
| ***G04G 21/06*** | (2010.01) |

(52) U.S. Cl.

CPC ................. *G04F 3/06* (2013.01); *G04G 9/00* (2013.01); *G04G 9/0088* (2013.01); *G04G 17/00* (2013.01); *G04G 17/04* (2013.01); *G04G 21/06* (2013.01)

(58) Field of Classification Search

CPC ........................................................ G04F 3/06

See application file for complete search history.

(56) References Cited

U.S. PATENT DOCUMENTS

| | | | | |
|---|---|---|---|---|
| 2006/0245303 | A1 | 11/2006 | Varon | |
| 2008/0101161 | A1 * | 5/2008 | Imai ......................... | G04G 9/04 368/76 |
| 2020/0019126 | A1 | 1/2020 | Scorgie et al. | |
| 2025/0004423 | A1 * | 1/2025 | Xu .......................... | G04F 1/005 |
| 2025/0085737 | A1 | 3/2025 | Arnould | |

OTHER PUBLICATIONS

English Translation of CN 214042920 (Year: 2021).*
English Translation of CN 218497354 (Year: 2023).*
English Translation of CN 219590897 (Year: 2023).*
English Translation of CN 103513570 (Year: 2014).*
English Translation of JP 5189199 (Year: 2013).*

* cited by examiner

*Primary Examiner* — Patrick N Edouard
*Assistant Examiner* — Eboni N Giles
(74) *Attorney, Agent, or Firm* — Hemisphere Law, PLLC

(57) ABSTRACT

An embodiment of the present invention provides a timer. The timer includes a housing, a visual indicator assembly, a digital display element and a visual display element; wherein the visual indicator assembly is arranged on the housing and includes a digital display zone and a visual display zone; the digital display element is arranged on the housing and is configured to display digital timing through the digital display zone; the visual display element is arranged on the housing and includes a first light-emitting element, and the first light-emitting element includes at least two sub-light sources whose on/off and/or brightness are independently controlled, so that the at least two sub-light sources cooperate with each other to display timing progress of different colors and/or brightness through the visual display zone.

18 Claims, 14 Drawing Sheets

Timer

TECHNICAL FIELD

The present invention relates to the technical field of timing, and in particular, to a timer.

BACKGROUND

A timer is a time measurement tool, which is widely used in people's lives. Traditional digital timers are generally composed of several simple numbers "8", representing hours, minutes, and seconds. With the development of technology, visual timers have appeared on the market and are loved by consumers.

The visual timer represents the visualization of time, which shows the passage of time and consists of a digital zone and a visual zone. At present, two main types of visual timers are available in the market, the first type is a mechanical movement visual timer, and the second type is an electronic screen visual timer.

The mechanical movement visual timer usually achieves the visualization of timing by displaying a color chip at a slit in the middle of a dial to visualize the timing. Generally, a power device of the mechanical movement inside the timer drives the color chip to rotate, and a size of the color chip displayed represents the remaining time, thereby achieving the visualization of timing. According to the mechanical movement visual timer, a gear transmission structure is usually adopted, which not only has a high failure rate, but also inevitably has running noise, distracting the attention of a user. Meanwhile, the timing error is large, and there are errors in the mechanical movement itself and setting. In addition, the mechanical movement driving capacity is relatively small, resulting in small torque on a movement shaft. During the timing process, a friction between a color chip and a dial may easily cause the timing process to stop. Moreover, the production process is complicated, the inspection is troublesome, and the countdown must be repeated many times according to a maximum range. The color of the color chip is relatively fixed and cannot be changed, so that the color chip must be replaced when a different color is required, which results in a poor user experience.

The electronic screen visual timer mainly achieves the visualization of timing by displaying a digital zone composed of several numbers "8" on a screen of the timer. A circle of shaped color blocks surrounding the digital zone, the entire color block is a visual zone, and a layer of color is silk-screened on an inner screen at a corresponding position of the visual zone. When the color block is displayed, the corresponding color is displayed, which makes the visual effect more vivid. The digital zone and the visual zone are timed synchronously to achieve a visual effect. For example, during the countdown process, the color blocks gradually decrease. The color displayed in the visual zone of such a timer is a silk-screen color, which usually cannot be changed; and a plurality of colors also need to be silk-screened when required, which is complicated in the production process. Meanwhile, the cost of the display screen and backlight panel is high, and the larger the size is, the higher the cost is.

SUMMARY

A primary objective of the present invention is to provide a timer with a low production cost, high working stability and a good user experience, so as to solve the problems.

An embodiment of the present invention provides a timer. The timer includes a housing, a visual indicator assembly, a digital display element and a visual display element; wherein the visual indicator assembly is arranged on the housing and includes a digital display zone and a visual display zone; the digital display element is arranged on the housing and is configured to display digital timing through the digital display zone; the visual display element is arranged on the housing and includes a first light-emitting element, and the first light-emitting element includes at least two sub-light sources whose on/off and/or brightness are independently controlled, so that the at least two sub-light sources cooperate with each other to display timing progress of different colors and/or brightness through the visual display zone.

Compared with the related art, according to the timer provided in the embodiment of the present application, two sub-light sources whose on/off and/or brightness are independently controlled are provided, so that the at least two sub-light sources cooperate with each other to display timing progress of different colors and/or brightness through the visual display zone. Therefore, the color or brightness display of the visual display zone of the timer is diversified, and a user may switch the built-in color or brightness based on personal preference, or edit the favorite color or brightness, so that the timer has a personalized display effect with a stronger visual effect, thereby improving the user experience.

In an embodiment, the visual indicator assembly includes a visual indicator member and a light diffusion layer, the visual indicator member includes a frame, the frame has a digital zone aperture corresponding to the digital display element and a visual zone aperture corresponding to the visual display element, the light diffusion layer is arranged at one side of the frame far away from the digital display element and the visual display element, the light diffusion layer includes a digital zone diffusion region corresponding to the digital zone aperture, a visual zone diffusion region corresponding to the visual zone aperture, and a light blocking area surrounding the digital zone diffusion region and the visual zone diffusion region. The light diffusion layer, the frame, the digital display element and the visual display element are sequentially arranged, so that the light emitted by the digital display element and the visual display element is concentratedly filtered through the digital zone aperture and the visual zone aperture after being blocked by the light blocking area, and then diffused in the digital zone diffusion region and the visual zone diffusion region. Therefore, the timer has a uniform and beautiful display effect, which is convenient for users to view and use, and the structure is compact, which is convenient for assembly and production, and reduces the production cost. The requirement of expanding a display size of the visual display zone is achieved by changing the size of the light diffusion layer without substantial cost increment.

In an embodiment, a plurality of the first light-emitting elements are provided, a plurality of the visual zone apertures are also provided, each of the first light-emitting elements is arranged corresponding to one of the visual zone apertures, a plurality of the visual zone diffusion regions are further provided, and each of the visual zone diffusion regions is also arranged corresponding to one of the visual zone apertures. The plurality of first light-emitting elements, the visual zone apertures and the visual zone diffusion regions in one-to-one correspondence are provided, so that the timing of the timer may be more accurate.

In an embodiment, a plurality of the first light-emitting elements are arranged around the digital display element; the digital display element includes a plurality of second light-emitting elements, the plurality of second light-emitting elements are configured to display timing numbers through a digital display aperture and the digital zone diffusion region; each of the first light-emitting elements includes at least two sub-light sources of different colors, and each of the sub-light sources is electrically connected to one corresponding switch element, so that the turn-on and turn-off of the sub-light sources are independently controlled; the timer further includes a control circuit board, the control circuit board is electrically connected to each sub-light source of the first light-emitting element, so that the brightness of each sub-light source is independently adjusted; and the first light-emitting elements and the second light-emitting elements are both arranged on the control circuit board. The plurality of first light-emitting elements are arranged around the digital display element, so that the user more easily observes the timing progress in a variety of ways and has a better user experience. In addition, each of the first light-emitting elements includes at least two sub-light sources of different colors, and the on/off and brightness of each sub-light source are adjusted separately, so that the timer can display different brightness and colors, and the user experience is better.

In an embodiment, the control circuit board is further configured to control the on/off and/or brightness of at least two different colored sub-light sources of each of the first light-emitting elements, such that the on/off or color of the plurality of light-emitting elements gradually changes with the decrease of the timing time, thereby allowing the visual display element to display timing progress of different quantities, lengths and/or colors. The control circuit board is configured to control the on/off and/or brightness of at least two different colored sub-light sources of each of the first light-emitting elements, so that the user obtains timing information intuitively by observing the gradual changes in quantity, color and brightness as the timing time decreases, thereby improving the practicality of the timer and the user experience.

In an embodiment, the frame includes a mounting groove, the digital zone aperture and the visual zone aperture penetrate through a bottom of the mounting groove, the light diffusion layer is arranged in the mounting groove, the housing includes a bottom housing and a light-transmitting cover plate, the light-transmitting cover plate is arranged in the mounting groove and positioned at one side of the light diffusion layer far away from the digital display aperture, the bottom housing is arranged at one side of the visual indicator assembly far away from the light diffusion layer, and the digital display element and the visual display element are positioned in a cavity surrounded by the bottom housing and the visual indicator assembly. The mounting groove is provided, so that the timer has a more compact structure and high stability, which is easy to produce and mount, thereby improving production efficiency.

In an embodiment, the timer further includes a control assembly, the control assembly is configured to control the on/off, brightness, timing time, volume, and/or music of the timer; the control assembly includes a control member, the control member is electrically connected to the control circuit board, and the control member includes a stepless adjusting member, and the stepless adjusting member is configured for a user to perform a first operation to set different timing times; the stepless adjusting member is a knob encoder, and the first operation includes a rotation operation; the stepless adjusting member is also configured for the user to perform a second operation to determine the setting, start and/or stop the timing, and the second operation includes a pressing operation. The control assembly is provided, so that the user may set the timer by rotating, pressing or the like, and the operation is easy and convenient.

In an embodiment, the stepless adjusting member includes a main body part electrically connected to the control circuit board and a knob part connected to the main body part, the bottom housing is provided with an opening, the knob part is mounted on the opening, and the control member further includes a stepless adjusting member protection cover, and the stepless adjusting member protection cover is sleeved on the knob part. The stepless adjusting member protection cover is provided, so that the user may easily hold or press the timer when operating the timer, making the operation more convenient and the user experience better.

In an embodiment, the control assembly further includes a brightness adjusting member, the brightness adjusting member is arranged on the housing and is electrically connected to the control circuit board, and the brightness adjusting member is configured for being operated by a user to send a brightness adjusting signal to the control circuit board, so that the control circuit board adjusts the brightness of the digital display element and/or the visual display element; the control assembly further includes a color adjusting member, the color adjusting member is arranged on the housing, and the color adjusting member is electrically connected to the control circuit board and is configured for being operated by a user to send a color adjusting signal to the control circuit board, so that the control circuit board adjusts the color of the digital display element and/or the visual display element; the control assembly further includes a volume adjusting member and a loudspeaker, the loudspeaker is configured to emit timing prompt sound under the control of the control circuit board, the volume adjusting member and the loudspeaker are electrically connected to the control circuit board, and the volume adjusting member is configured for being operated by a user to emit a volume adjusting signal to the control circuit board, so that the control circuit board controls the volume of the loudspeaker; the control assembly further includes a music selection member, the loudspeaker is further configured to play music under the control of the control circuit board, and the music selection member is configured for being operated by a user to select music data played by the loudspeaker; and the control assembly further includes a switch member, and the switch member is electrically connected to the control circuit board and configured for being operated by a user to control on/off of the timer. The brightness adjusting member, the color adjusting member, the volume adjusting member and the music selection member are provided, so that the timer better meets the usage preferences of different users and provides a better user experience.

In an embodiment, the timer further includes a power supply assembly and a charging interface, wherein the power supply assembly is arranged in the housing and is electrically connected to the control circuit board, at least a portion of the charging interface is exposed through the housing and is electrically connected to the control circuit board, and is configured to connect an external data line to charge the power supply assembly; and the control assembly is mounted on the housing. The power supply assembly and the charging interface are provided, so that the timer may be used both when plugged in and after being charged, and the application scenarios are more extensive.

An embodiment of the present application further provides a timer. The timer includes: a housing; a visual indicator assembly arranged on the housing and including a digital display zone and a visual display zone; a digital display element arranged on the housing and configured to display digital timing time through the digital display zone; and a visual display element arranged on the housing and including a first light-emitting element, wherein the first light-emitting element includes at least one sub-light source, and the at least one sub-light source is capable of displaying a timing progress of different colors and/or brightness through the visual display zone.

Compared with the related art, according to the timer provided in the embodiment of the present application, at least one sub-light source is arranged to display the timing progress of different colors and/or brightness through the visual display zone, so that the colors of the visual display zone of the timer are diversified, and a user may switch the built-in color based on personal preference, or edit the favorite color. Therefore, the timer has a personalized display effect with a stronger visual effect, thereby improving the user experience.

BRIEF DESCRIPTION OF DRAWINGS

To more clearly illustrate the technical solutions in the embodiments of the present invention or in the prior art, the drawings required to be used in the description of the embodiments or the prior art are briefly introduced below. It is clear that the drawings in the description below are some embodiments of the present invention, and those of ordinary skill in the art can obtain other drawings according to the structures illustrated in these drawings without creative efforts.

DETAILED DESCRIPTION OF EMBODIMENTS

Figure 1:
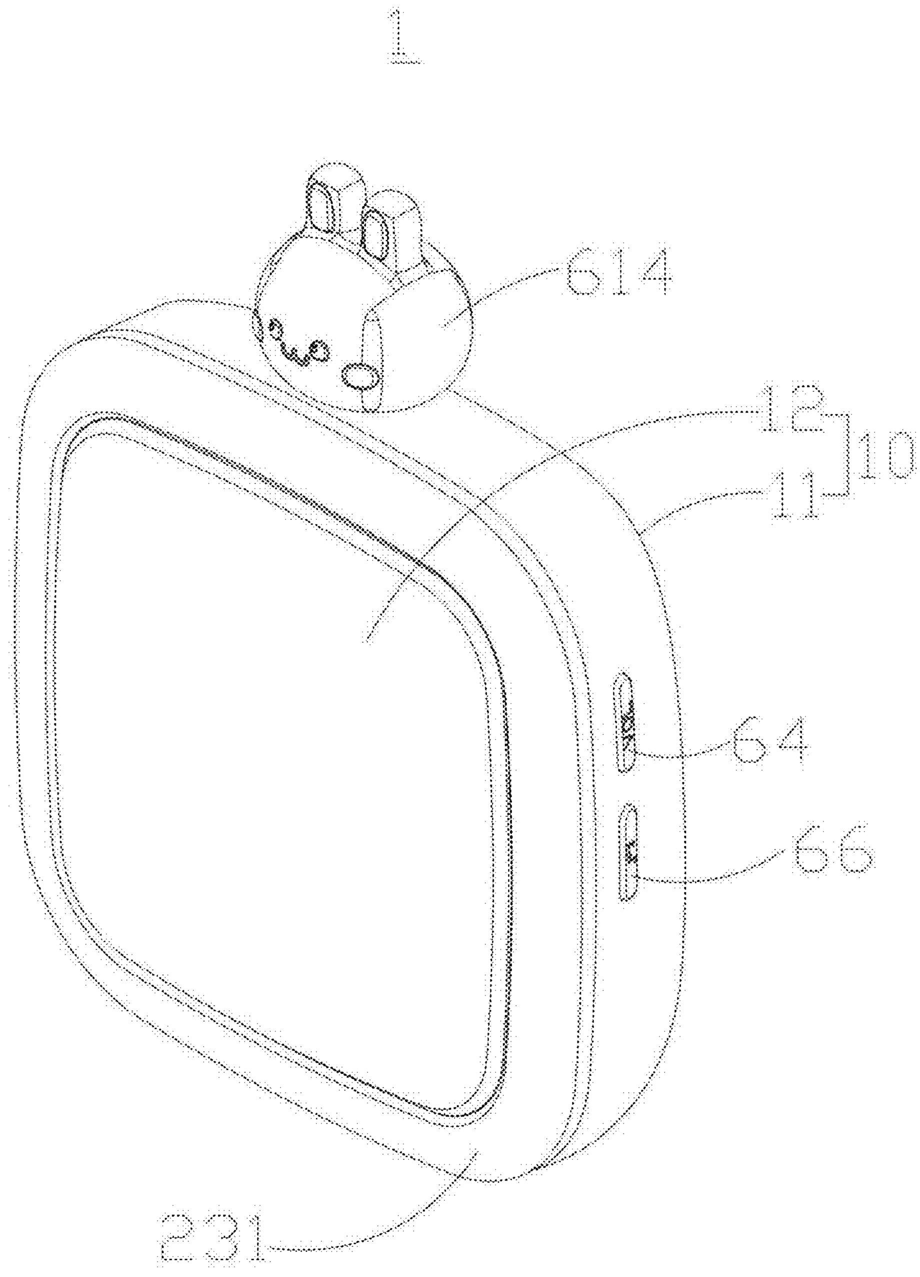
FIG. 1 is a three-dimensional view of a timer according to the present invention.
Figure 2:
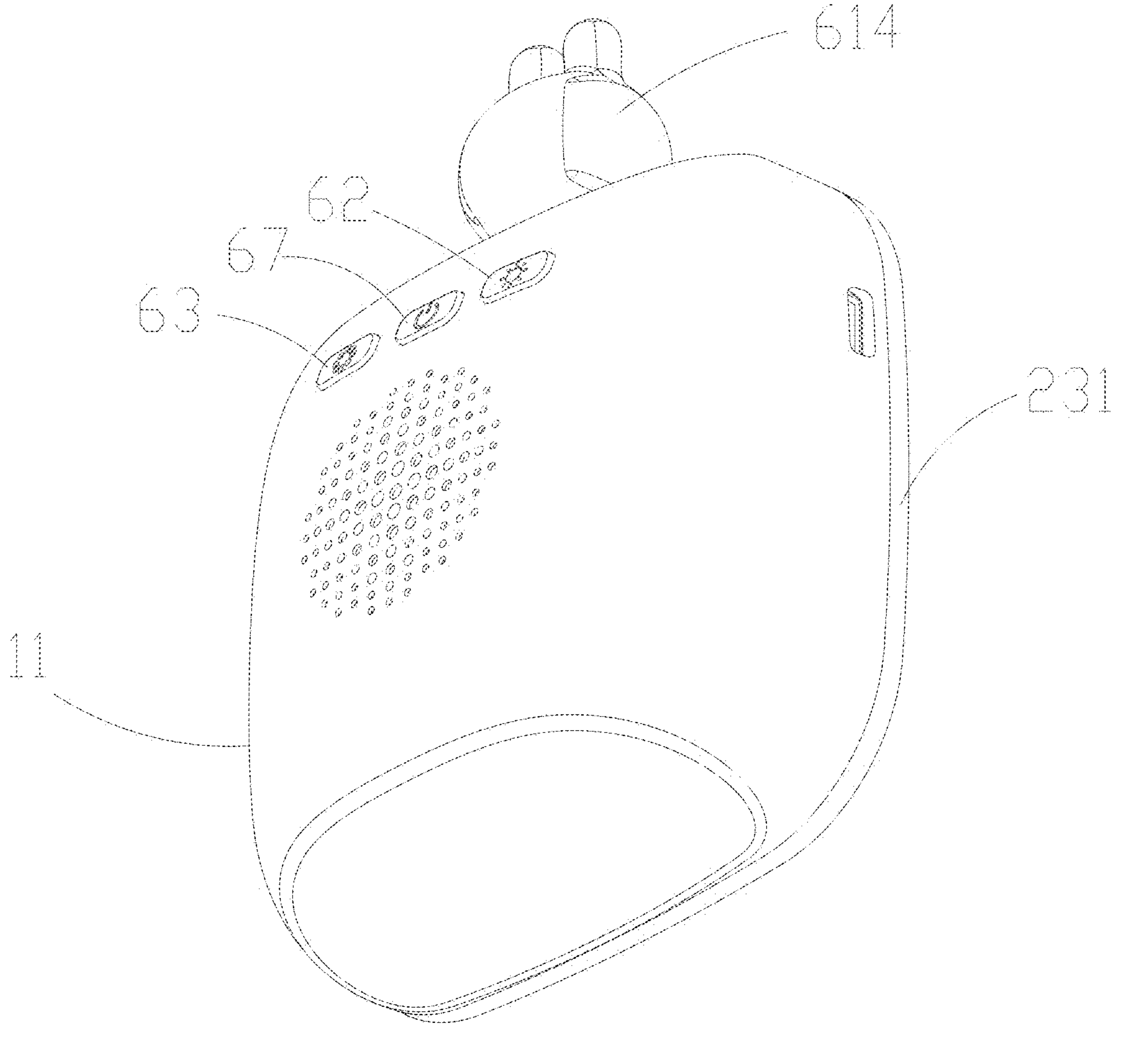
FIG. 2 is a three-dimensional view of a multi-screen timer according to the present invention from another angle.
Figure 3:
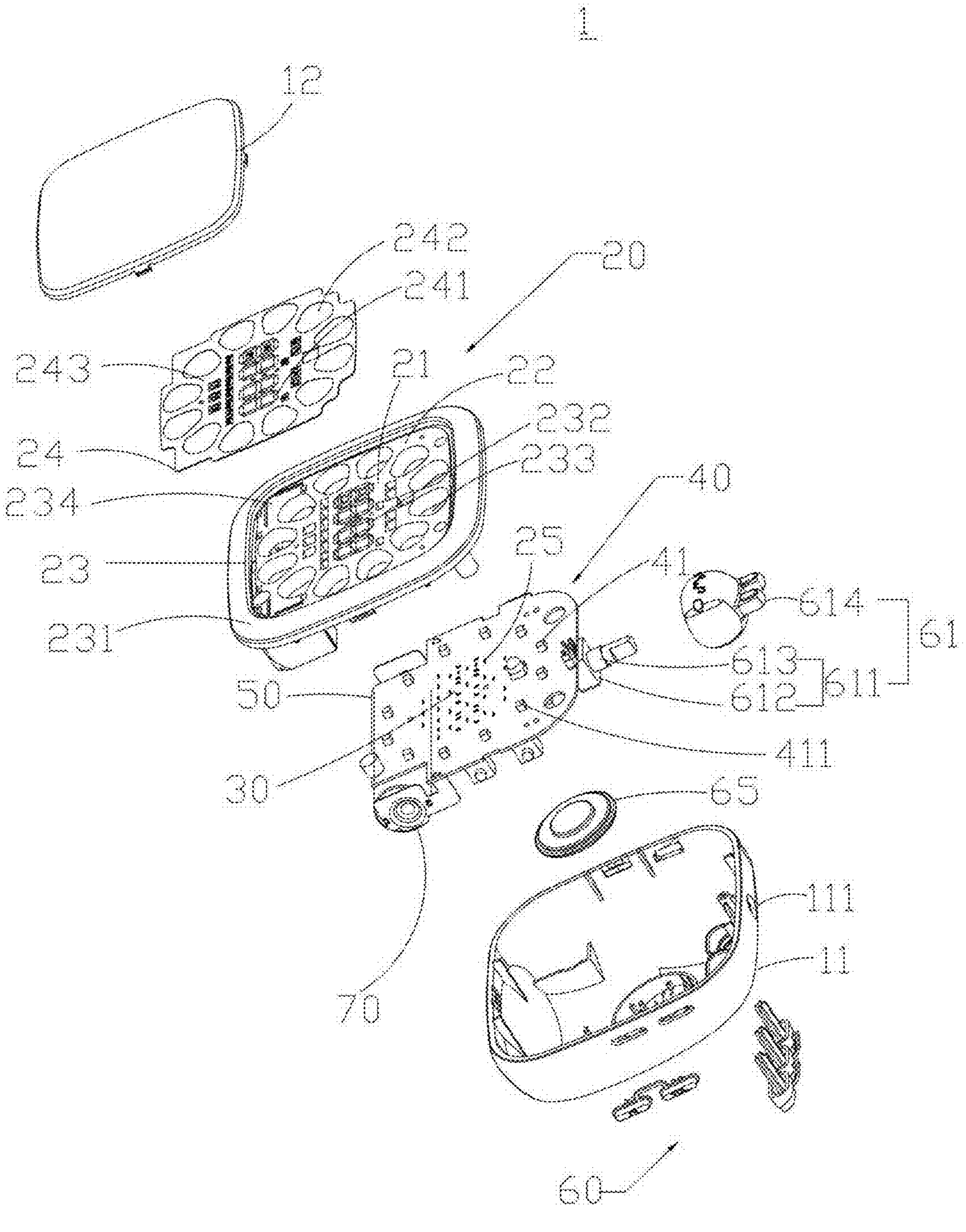
FIG. 3 is an exploded view of a timer according to the present invention.
Figure 4:
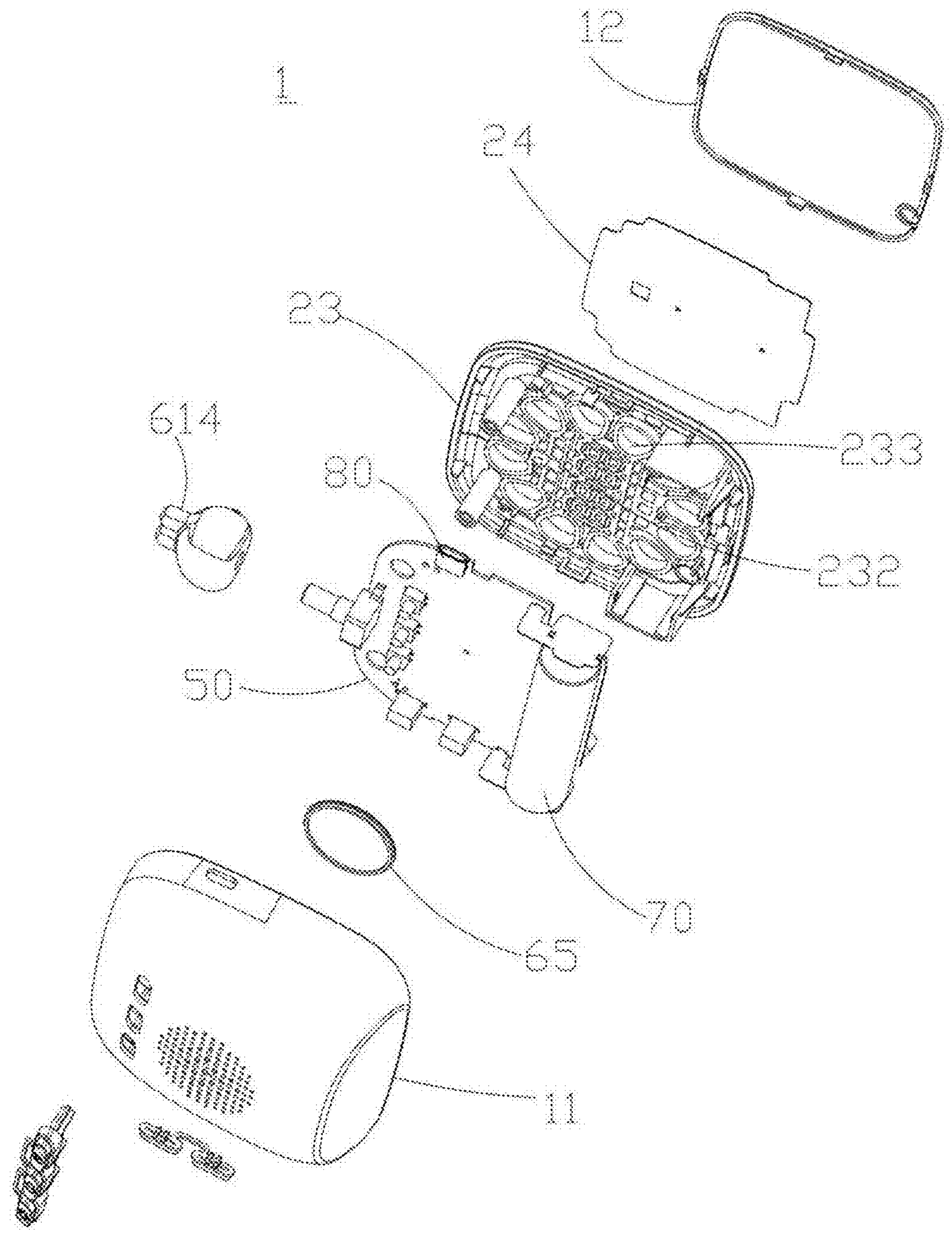
FIG. 4 is an exploded view of a timer according to the present invention from another angle.
Figure 5:
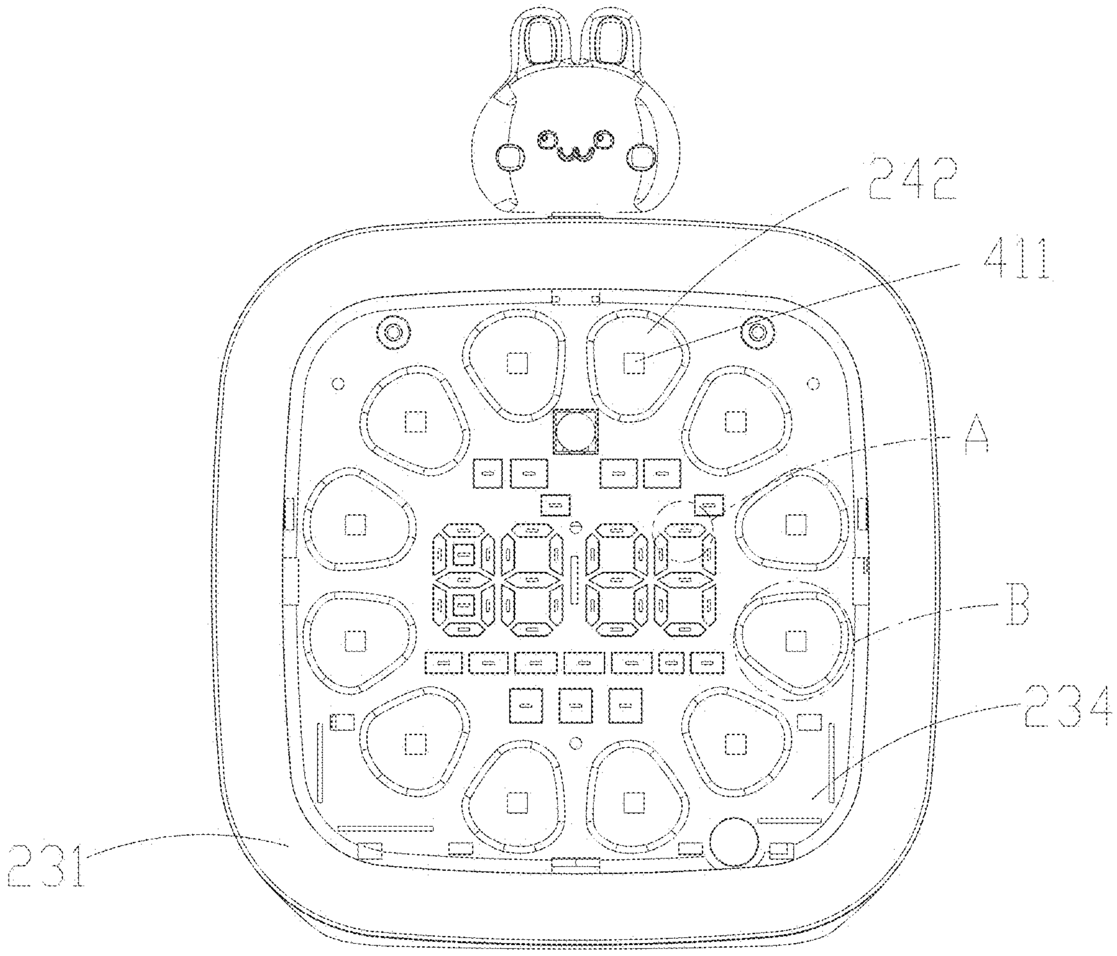
FIG. 5 is a schematic diagram of a digital display zone and a visual display zone of a timer according to the present invention.
Figure 6:
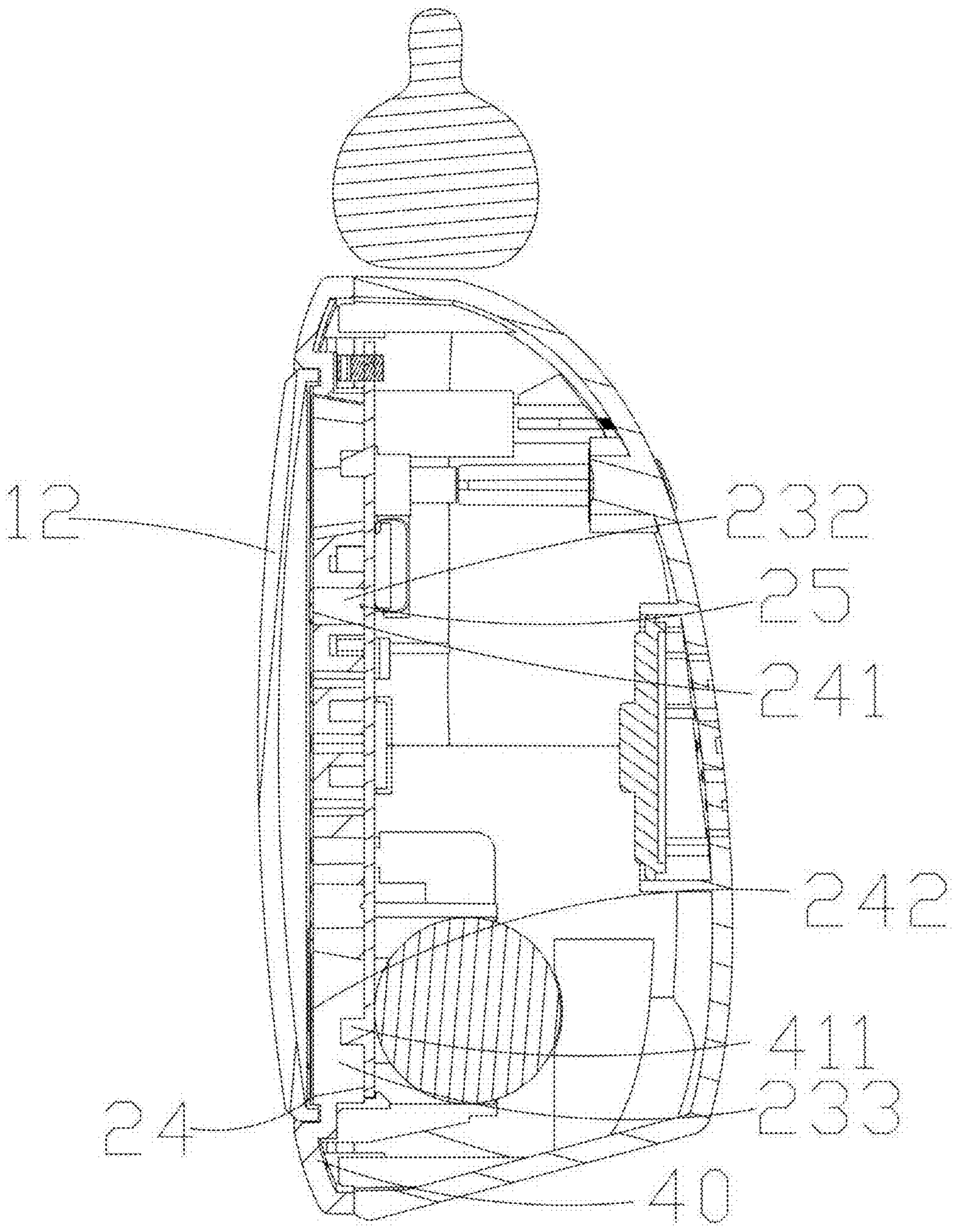
FIG. 6 is a cross-sectional view of a timer according to the present invention.
Figure 7:
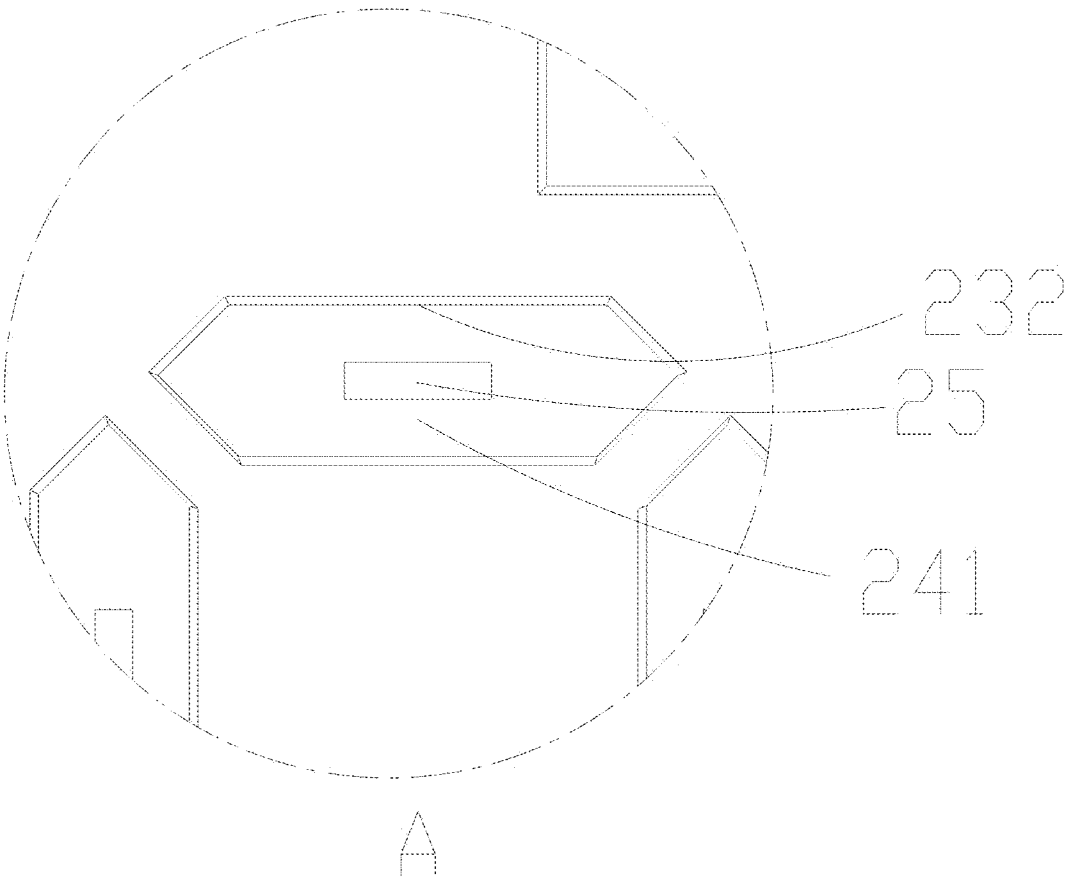
FIG. 7 is an enlarged view of region A of a digital display element of the timer shown in FIG. 5.
Figure 8:
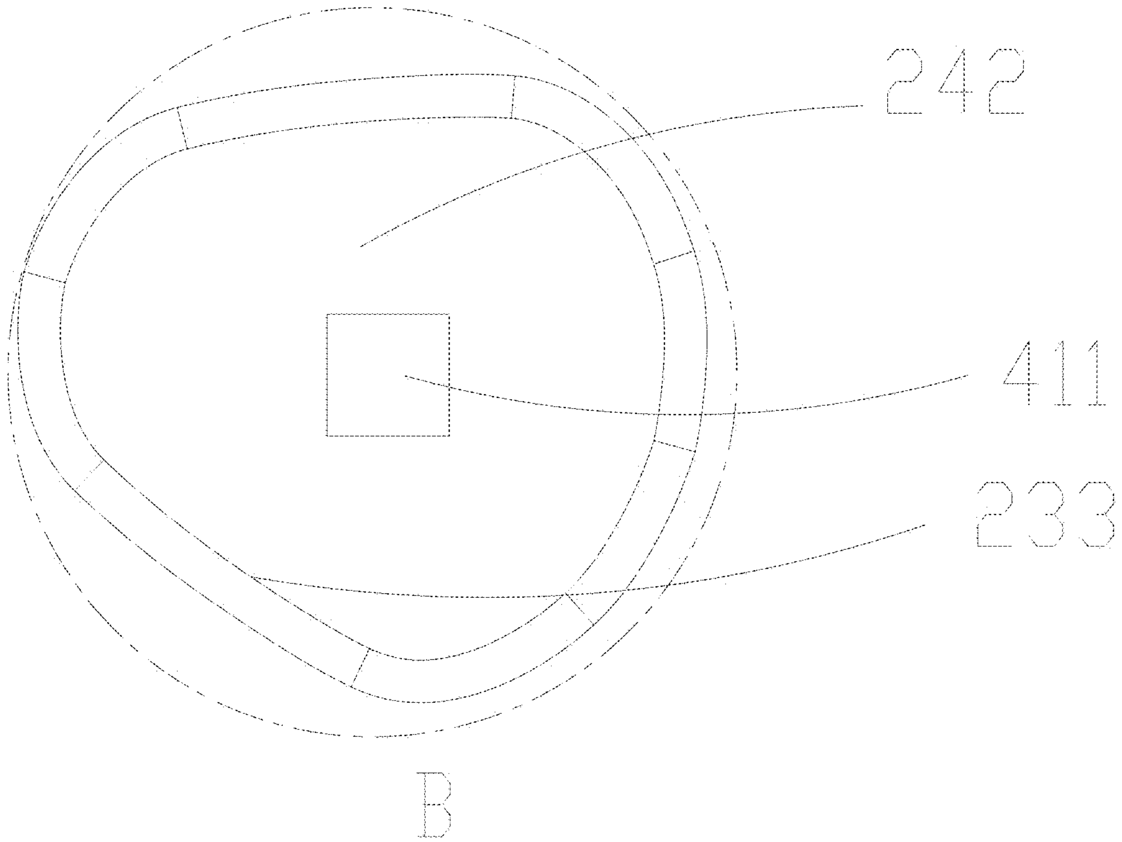
FIG. 8 is an enlarged view of region B of a visual display element of the timer shown in FIG. 5.

The following clearly and completely describes the technical solutions in the embodiments of the present invention with reference to drawings in the embodiments of the present invention. It is clear that the described embodiments are merely a part rather than all of the embodiments of the present invention. All other embodiments obtained by those of ordinary skill in the art based on embodiments of the present invention without creative efforts shall fall within the protection scope of the present invention.

Referring to FIGS. 1 to 5, an embodiment of the present invention provides a timer 1. The timer 1 includes a housing 10, a visual indicator assembly 20, a digital display element and a visual display element 40; wherein the visual indicator assembly 20 is arranged on the housing 10 and includes a digital display zone 21 and a visual display zone 22; the digital display element is arranged on the housing 10 and is configured to display digital timing through the digital display zone 21; the visual display element 40 is arranged on the housing 10 and includes a first light-emitting element 41, and the first light-emitting element 41 includes at least two sub-light sources 411 whose on/off and/or brightness are independently controlled, so that the at least two sub-light sources 411 cooperate with each other to display timing progress of different colors and/or brightness through the visual display zone 22. The timing progress may represent the remaining time or the time that has been counted, and may be displayed in the form of a progress bar. In this embodiment, the progress bar may be displayed as a long progress bar consisting of a plurality of progress points arranged in a straight line, or as a circular progress bar consisting of a plurality of progress points arranged in a circle. The shape of the progress points includes but is not limited to rectangle, triangle, sector, circle, and the like.

It may be understood that, in this embodiment, the timer 1 may display timing progress for a user by two display modes. When the user uses the timer 1, the timing progress may be observed through the numbers displayed in the digital display zone 21 and the luminous graphics displayed in the visual display zone 22. When the user needs to pay attention to the precise timing progress, the specific time information of the current timing may be obtained through the numbers displayed in the digital display zone 21. When the user does not need to pay attention to the precise timing progress or the user is a young child, the timing progress may be observed through the luminous graphics displayed in the visual display zone 22, which is convenient for people with different demands to use. In addition, the first light-emitting element 41 of the visual display element 40 includes at least two sub-light sources 411, and the sub-light sources 411 may be controlled in on/off and/or brightness independently. In the different on-off states and/or brightness states of the at least two sub-light sources 411, after the light emission of the at least two sub-light sources 411 is superimposed and mixed, different colors and/or brightness may be displayed through the visual display zone 22. For example, the brightness displayed after the timing is completed is lower than the brightness displayed during the timing, or the color displayed after the timing is completed is different from the color displayed during the timing, so as to facilitate intuitive observation by the user and provide a better user experience.

According to the timer 1 provided in the embodiment of the present application, two sub-light sources 411 whose on/off and/or brightness are independently controlled are provided, so that the at least two sub-light sources 411 cooperate with each other to display timing progress of different colors and/or brightness through the visual display zone 22, and the color/brightness of the visual display zone 22 of the timer 1 is diversified, so as to intuitively display the timing progress. Meanwhile, a user may switch the built-in color and/or brightness based on personal preference, or edit the favorite color and/or brightness, so that the timer 1 has a personalized display effect with a stronger visual effect, thereby improving the user experience.

Specifically, as shown in FIGS. 6 to 9, the visual indicator assembly 20 includes a visual indicator member 23 and a light diffusion layer 24, the visual indicator member 23 includes a frame 231, the frame 231 has a digital zone aperture 232 corresponding to the digital display element and a visual zone aperture 233 corresponding to the visual display element 40, the light diffusion layer 24 is arranged at one side of the frame 231 far away from the digital display element and the visual display element 40, the light diffusion layer 24 includes a digital zone diffusion region 241 corresponding to the digital zone aperture 232, a visual zone diffusion region 242 corresponding to the visual zone aperture 233, and a light blocking area 243 surrounding the digital zone diffusion region 241 and the visual zone diffusion region 242.

It may be understood that the digital display element diffuses light in the digital zone diffusion region 241 through the digital zone aperture 232, the visual display element 40 diffuses light in the visual zone diffusion region 242 through the visual zone aperture 233, and the rest is blocked by the light blocking area 243, so as to further highlight the digital zone diffusion region 241 and the visual zone diffusion region 242, thereby improving the display effect of the timer 1. The light diffusion layer 24, the frame 231, the digital display element and the visual display element 40 are sequentially arranged, so that the light emitted by the digital display element and the visual display element 40 is concentratedly filtered through the digital zone aperture 232 and the visual zone aperture 233 after being blocked by the light blocking area 243, and then diffused in the digital zone diffusion region 241 and the visual zone diffusion region 242. Therefore, the timer 1 has a uniform and beautiful display effect, which is convenient for users to view and use, and the structure is compact, which is convenient for assembly and production, and reduces the production cost. The requirement of expanding a display size of the visual display zone 22 is achieved by changing the size of the light diffusion layer 24, the digital zone aperture 232 and the visual zone aperture 233 without substantial cost increment.

Further, a plurality of the first light-emitting elements 41 are provided, a plurality of the visual zone apertures 233 are also provided, each of the first light-emitting elements 41 is arranged corresponding to one of the visual zone apertures 233, a plurality of the visual zone diffusion regions 242 are further provided, and each of the visual zone diffusion regions 242 is also arranged corresponding to one of the visual zone apertures 233. In this embodiment, the number of the first light-emitting elements 41 may be a multiple of 4, that is, the visual display zone 22 is divided into 4 regions, and each region is allocated with the same number of the first light-emitting elements 41. This design has a better and natural display effect, and a user experience is high. For example, in this embodiment, if 12 first light-emitting elements 41 are provided, 12 corresponding visual zone apertures 233 are provided, 12 visual zone diffusion regions 242 are also provided, and the three correspond one to one. The plurality of first light-emitting elements 41, the visual zone apertures 233 and the visual zone diffusion regions 242 in one-to-one correspondence are provided, so that the timing of the timer 1 may be more accurate, and the timing progress may be observed more easily.

Further, the plurality of first light-emitting elements 41 are annularly provided around the digital display element; the digital display element includes a plurality of second light-emitting elements 25, and the plurality of second light-emitting elements 25 are configured to display timing numbers through the digital display aperture and the digital zone diffusion region 241. In this embodiment, the second light-emitting elements 25 may be LED light sources, 7 second light-emitting elements 25 may form a number “8”, and a corresponding number of the second light-emitting elements 25 may be provided according to the requirement of the time counting range. For example, if the maximum time counting range of the timer 1 is 99 minutes, the digital display element may include 2 numbers “8”, i.e., 14 second light-emitting elements 25. For higher accuracy of time counting, the digital display element may also include 4 numbers “8”, i.e., 28 second light-emitting elements 25, wherein two numbers “8” represent minutes, and the other two numbers “8” represent seconds, numbers 0, 1, 2, 3, 4, 5, 6, 7, 8, 9 may be displayed by controlling the on/off of 7 second light-emitting elements 25 of each number “8”. Similarly, if the timing range is to be increased, a plurality of the second light-emitting elements 25 may be added, for example, two more numbers “8” are added to represent hours, that is, 14 second light-emitting elements 25 may be added.

Figure 9:
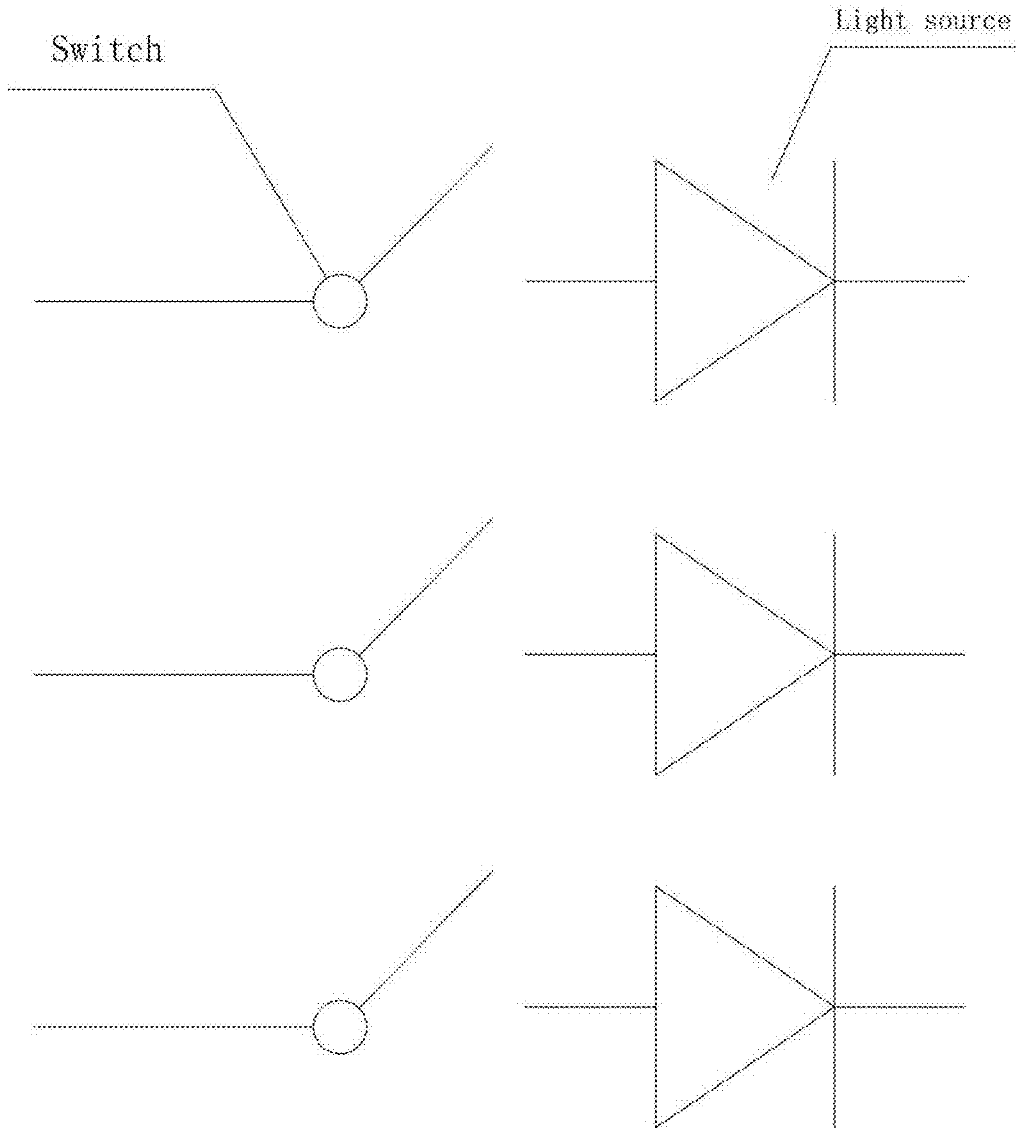
FIG. 9 is a circuit diagram of a visual display element of a timer according to the present invention.

In addition, each of the first light-emitting elements 41 includes at least two sub-light sources 411 of different colors, and each of the sub-light sources 411 is electrically connected to one corresponding switch element (not shown), so that the turn-on and turn-off of the sub-light sources 411 are independently controlled; the timer 1 further includes a control circuit board 50, the control circuit board 50 is electrically connected to each sub-light source 411 of the first light-emitting element 41, so that the brightness of each sub-light source 411 is independently adjusted; and the first light-emitting elements 41 and the second light-emitting elements 25 are both arranged on the control circuit board 50. It may be understood that the plurality of first light-emitting elements 41 arranged around the digital display element may save the display size of the visual display zone 22, thereby reducing production costs and making it easier for users to observe the timing progress of the digital display and the visual display at the same time. At least two sub-light sources 411 of different colors included in each of the first light-emitting elements 41 may be LED light sources of different colors, or may be other types of light sources of different colors, and the at least two sub-light sources 411 of different colors may be independently turned on and off, so that when one of the sub-light sources 411 is turned on, the visual display zone 22 displays the color of the sub-light source 411, when another sub-light source 411 is turned on, the visual display zone 22 displays the color of another sub-light source 411, and when two sub-light sources 411 are turned on, the color mixed by the two sub-light sources 411 is displayed. Meanwhile, the control circuit board 50 may also control the brightness of each sub-light source 411 of the first light-emitting element 41, so that when the brightness of the two sub-light sources 411 is adjusted under the control of the control circuit board 50, more colors may be further mixed for displaying. To make the colors displayed by the first light-emitting elements 41 richer, in another embodiment, each of the first light-emitting elements 41 may also include three sub-light sources 411 with different colors, such as red, yellow and blue light sources, and the three sub-light sources 411 with different colors are turned on/off and adjusted in brightness under the control of the control circuit board 50. As shown in FIG. 9, the three switch elements are respectively electrically connected to the three sub-light sources 411 with different colors, and the on/off of the three sub-light sources 411 with different colors is independently controlled, so that more different colors may be mixed for displaying. Since each of the sub-light sources 411 may be controlled by a corresponding switch element, independent on/off control may be achieved, and the brightness of each sub-light source 411 of the first light-emitting element 41 may also be adjusted independently by the control circuit board 50. The control element is a purely electronic component, so that the timer 1 has high stability and accurate timing, and no noise during the timing process, which does not disturb the user. The plurality of first light-emitting elements 41 are arranged around the digital display element, so that the user more easily observes the timing progress in a variety of ways and has a better user experience. In addition, each of the first light-emitting elements 41 includes at least two sub-light sources 411 of different colors, and the on/off and brightness of each sub-light source 411 is adjusted separately, so that the timer 1 can display different brightness and colors, and the user experience is better.

Specifically, the control circuit board 50 is further configured to control the on/off and/or brightness of at least two different colored sub-light sources 411 of each of the first light-emitting elements 41, such that the on/off or color of the plurality of light-emitting elements gradually changes with the decrease of the timing time, thereby allowing the visual display element 40 to display timing progress of different quantities, lengths and/or colors.

It may be understood that, under the control of the control circuit board 50, each of the first light-emitting elements 41 may present on/off and/or different colors and brightness under different timing progress or states, so that the user may intuitively know the timing progress. For example, in an embodiment, when each of the first light-emitting elements 41 includes the red, yellow and blue sub-light source 411, the blue sub-light source is displayed when the remaining time is greater than or equal to 30 minutes, the yellow sub-light source is displayed when the remaining time is less than 30 minutes and greater than 15 minutes, the red sub-light source is displayed when the remaining time is less than or equal to 15 minutes, and the sub-light source 411 may be turned off when the remaining time is 0, so that the user may know the timing progress by observing different numbers, lengths and/or colors displayed by the visual display element 40. In another embodiment, the brightness of the first light-emitting element 41 may be adjusted to be high when the remaining time is less than 30 minutes and greater than 15 minutes, the brightness of the first light-emitting element 41 may be reduced when the remaining time is less than or equal to 15 minutes, and the first light-emitting element 41 may be turned off when the remaining time is 0, so that the user may know the timing progress by observing different numbers, lengths and/or colors displayed by the visual display element 40. The control circuit board 50 is configured to control the on/off and/or brightness of at least two different colored sub-light sources 411 of each of the first light-emitting elements 41, so that the user obtains timing information intuitively by observing the gradual changes in quantity, color and brightness as the timing time decreases, thereby improving the practicality of the timer 1 and the user experience.

Further, the frame 231 includes a mounting groove 234, the digital zone aperture 232 and the visual zone aperture 233 penetrate through a bottom of the mounting groove 234, the light diffusion layer 24 is arranged in the mounting groove 234, the housing 10 includes a bottom housing 11 and a light-transmitting cover plate 12, the light-transmitting cover plate 12 is arranged in the mounting groove 234 and positioned at one side of the light diffusion layer 24 far away from the digital display aperture, the bottom housing 11 is arranged at one side of the visual indicator assembly 23 far away from the light diffusion layer 24, and the digital display element and the visual display element 40 are positioned in a cavity surrounded by the bottom housing 11 and the visual indicator assembly 23. The mounting groove 234 is provided, so that the timer 1 has a more compact structure and high stability, which is easy to produce and mount, thereby improving production efficiency.

Further, the timer 1 further includes a control assembly 60, the control assembly 60 is configured to control the on/off, brightness, timing time, volume, and/or music of the timer 1; the control assembly 60 includes a control member 61, the control member 61 is electrically connected to the control circuit board 50, and the control member 61 includes a stepless adjusting member, and the stepless adjusting member is configured for a user to perform a first operation to set different timing times; the stepless adjusting member is a knob encoder, and the first operation includes a rotation operation; the stepless adjusting member is also configured for the user to perform a second operation to determine the setting, start and/or stop the timing, and the second operation includes a pressing operation. The control assembly 60 is provided, so that the user 1 may set the timer by rotating, pressing or the like, and the operation is easy and convenient.

Further, the stepless adjusting member includes a main body part 612 electrically connected to the control circuit board 50 and a knob part 613 connected to the main body part 612, the bottom housing 11 is provided with an opening 111, the knob part 613 is mounted on the opening 111, and the control member 61 further includes a stepless adjusting member protection cover, and the stepless adjusting member protection cover is sleeved on the knob part 613. In this embodiment, the stepless adjusting member protection cover is in the shape of a little rabbit. During the production process, the stepless adjusting member protection cover may also be processed into other shapes based on a market requirement to meet the preferences of different users. The stepless adjusting member protection cover is provided, so that the user may easily hold or press the timer when operating the timer 1, making the operation more convenient and the user experience better.

Specifically, the control assembly 60 further includes a brightness adjusting member 62, the brightness adjusting member 62 is arranged on the housing 10, the brightness adjusting member 62 is electrically connected to the control circuit board 50 and is configured for being operated by a user to send a brightness adjusting signal to the control circuit board 50, so that the control circuit board 50 adjusts the brightness of the digital display element and/or the visual display element 40; the control assembly 60 further includes a color adjusting member 63, the color adjusting member 63 is arranged on the housing 10, and the color adjusting member 63 is electrically connected to the control circuit board 50 and is configured for being operated by a user to send a color adjusting signal to the control circuit board 50, so that the control circuit board 50 adjusts the color of the digital display element and/or the visual display element 40; the control assembly 60 further includes a volume adjusting member 64 and a loudspeaker 65, the loudspeaker 65 is configured to emit timing prompt sound under the control of the control circuit board 50, the volume adjusting member 64 and the loudspeaker 65 are electrically connected to the control circuit board 50, and the volume adjusting member 64 is configured for being operated by a user to emit a volume adjusting signal to the control circuit board 50, so that the control circuit board 50 controls the volume of the loudspeaker 65; the control assembly 60 further includes a music selection member 66, the loudspeaker 65 is further configured to play music under the control of the control circuit board 50, and the music selection member 66 is configured for being operated by a user to select music data played by the loudspeaker 65; and the control assembly 60 further includes a switch member 67, and the switch member 67 is electrically connected to the control circuit board 50 and configured for being operated by a user to control on/off of the timer 1. It may be understood that, after the timer 1 completes timing, the user may be prompted by a prompt sound, and the user may select the favorite music as the prompt sound through the music selection member 66, so that the use of the timer 1 is more humanized. Meanwhile, the user may also adjust the brightness and color of the numbers displayed in the digital display zone 21 and the brightness and color of the visual graphics displayed in the visual display zone 22 through the brightness adjusting member 62 and the color adjusting member 63 based on the usage scenario, color preference and the like, and may also adjust the volume of the prompt sound through the volume adjusting member 64. In this embodiment, the brightness of the digital display zone 21 and the visual display zone 22 may be adjusted by clicking the brightness adjusting member 62. The control circuit board 50 is provided with a pre-set color combination.

Clicking the color adjusting member 63 may adjust the color combination of the visual display zone 22. Long-pressing the color adjusting member 63 may adjust the colors of the 12 visual graphics in turn and combine the user's favorite color combination. Clicking the volume adjusting member 64 may adjust the volume of the prompt sound or adjust the sound to mute. Clicking the music selection member 66 may select different music. The brightness adjusting member 62, the color adjusting member 63, the volume adjusting member 64 and the music selection member 66 are provided, so that the timer 1 better meets the usage preferences of different users and provides a better user experience.

Further, the timer 1 further includes a power supply assembly 70 and a charging interface 80, wherein the power supply assembly 70 is arranged in the housing 10 and is electrically connected to the control circuit board 50, at least a portion of the charging interface 80 is exposed through the housing 10 and is electrically connected to the control circuit board 50, and is configured to connect an external data line to charge the power supply assembly 70; and the control assembly 60 is mounted on the housing 10. The power supply assembly 70 and the charging interface 80 are provided, so that the timer 1 may be used both when plugged in and after being charged, and the application scenarios are more extensive.

Referring to FIGS. 10 to 14, the working process of the timer 1 is described below with reference to the drawings.

Figure 10:
FIG. 10 is a schematic diagram of a timer according to the present invention set to 60 minutes.
Figure 11:
FIG. 11 is a schematic diagram of a timer according to the present invention with 45 minutes remaining.
Figure 12:
FIG. 12 is a schematic diagram of a timer according to the present invention with 30 minutes remaining.
Figure 13:
FIG. 13 is a schematic diagram of a timer according to the present invention with 15 minutes remaining.
Figure 14:
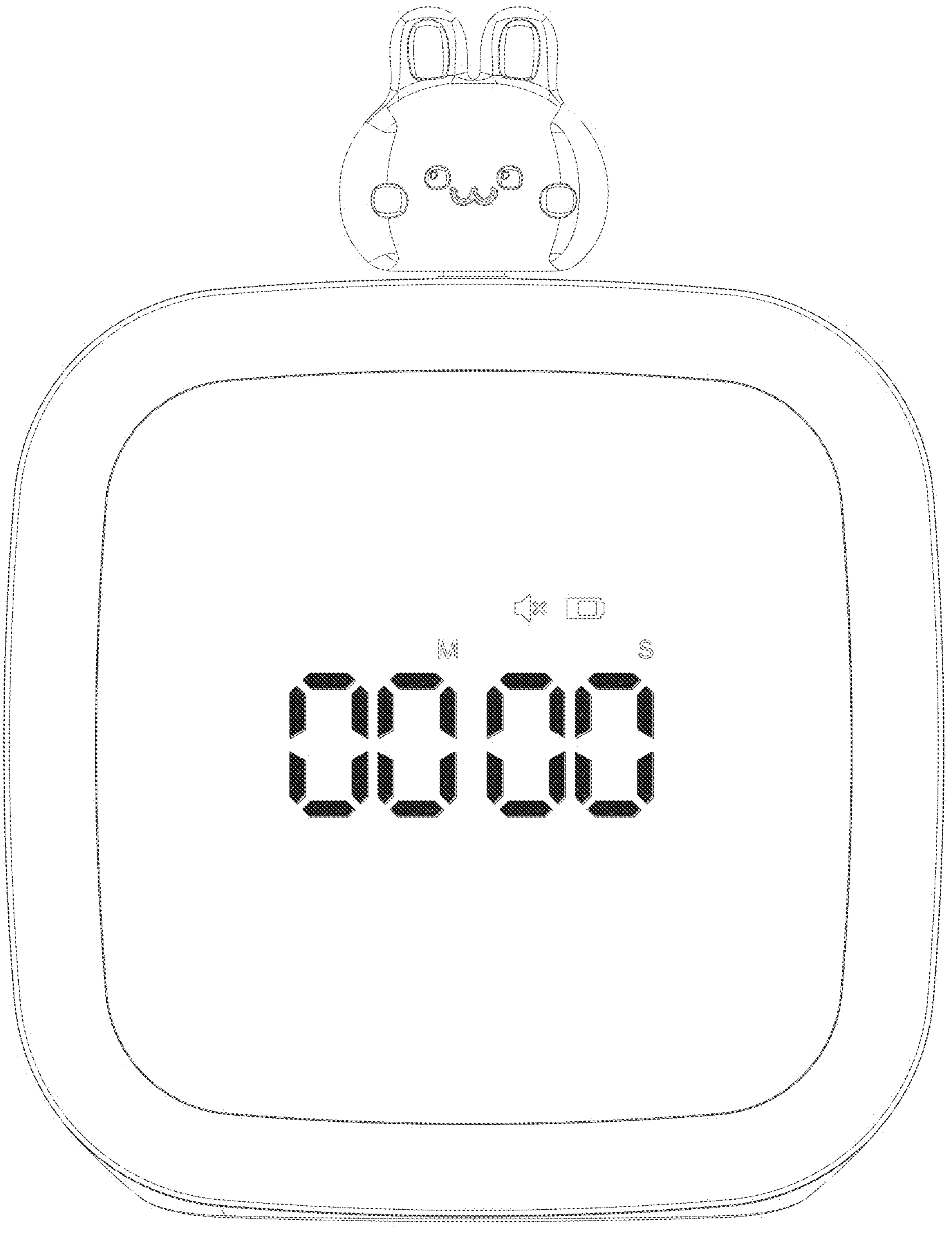
FIG. 14 is a schematic diagram of a timer according to the present invention at the end of the countdown.

The following description is made using the countdown as an example. When the user uses the timer 1, the user first turns on the timer 1 through the switch member 67, and then the user may make personalized settings according to personal preferences, that is, the brightness, color, volume and music displayed by the timer 1 are set through the brightness adjusting member 62, the color adjusting member 63, the volume adjusting member 64 and the music selection member 66. The above settings are saved and do not need to be set every time the timer is turned on. Then, the user may rotate the stepless adjusting member protection cover 614 to rotate the stepless adjusting member 611 to set the timing time. In this embodiment, clockwise rotation indicates time increase, and counterclockwise rotation indicates time decrease. As shown in FIG. 10, the timing time is set to 60 minutes. The user may also select to set the seconds by rotating the stepless adjusting member protection cover 614 to rotate the stepless adjusting member 611, and the setting method is the same as the minute setting. Then, when the user presses the stepless adjusting member 611 by pressing the stepless adjusting member protection cover 614, the countdown begins. In this case, the digital display zone 21 displays the timing time "60:00", and the visual display zone 22 lights up 12 visual graphics. During the countdown, as time passes, when the remaining time is 45 minutes, as shown in FIG. 11, the digital display zone 21 displays the countdown time "45:00", and the visual display zone 22 turns off 3 visual graphics and continues to light up 9 visual graphics. When the remaining time is 30 minutes, as shown in FIG. 12, the digital display zone 21 displays the timing time "30:00", the visual display zone 22 turns off 3 visual graphics and continues to light up 6 visual graphics; when the remaining time is 15 minutes, as shown in FIG. 13, the digital display zone 21 displays the timing time "15:00", the visual display zone 22 turns off 3 visual graphics and continues to light up 3 visual graphics; when the timing ends, as shown in FIG. 14, the digital display zone 21 displays the timing time "00:00", and all the visual graphics in the visual display zone 22 turn off. Meanwhile, according to the music selected by the user and the adjusted volume, a prompt sound reminder is given, and the user may press the stepless adjusting member protection cover 614 to press the stepless adjusting member 611 to operate the timer 1 to stop the prompt sound reminder. During the timing process, the user may also press the stepless adjusting member protection cover 614 to press the stepless adjusting member 611 to operate the timer 1 to pause and continue timing.

The foregoing is the basic operation process of the timer 1. The user may also change the settings of the timer 1 to make the visual display zone 22 display in other ways such as color and brightness. The operation steps are similar to the above process and are not repeated herein again.

It should be noted that, if all directional indications (such as upper, lower, left, right, front and rear) are involved in the embodiments of the present invention, the directional indications are only used to explain the relative positional relationships, the motion situations and the like between individual components under a certain pose (as shown in the drawings), and if the certain pose is changed, the directional indications are changed accordingly.

In addition, the descriptions "first" and "second" in the present invention are merely intended for a purpose of description, and shall not be understood as an indication or implication of relative importance or an implicit indication of a quantity of indicated technical features. Thus, a feature defined by "first" or "second" may explicitly or implicitly include at least one such feature. In addition, "and/or" appearing herein includes three solutions, and taking "A and/or B" as an example, it includes solution A, or solution B, or both solution A and solution B. In addition, the technical solutions among various embodiments may be combined with each other, however, this combination must be based on that it can be realized by those of ordinary skill in the art. When the combination of the technical solutions is contradictory or cannot be realized, such a combination of the technical solutions should not be considered to exist, and is not within the protection scope of the present invention.

The above mentioned contents are only optional embodiments of the present invention and are not intended to limit the patent scope of the present invention, and under the inventive concept of the present invention, the equivalent structure transformations made by using the contents of the specification and the drawings of the present invention, or direct/indirect applications to other related technical fields, are all included in the patent protection scope of the present invention.

The invention claimed is:

1. A timer, comprising:

a housing;

a visual indicator assembly arranged on the housing and comprising a digital display zone and a visual display zone;

a digital display element arranged on the housing and configured to display digital timing time through the digital display zone; and a visual display element arranged on the housing and comprising a plurality of first light-emitting elements, wherein each of the first light-emitting elements comprises at least two sub-light sources whose on/off and/or brightness are independently controlled, so that the at least two sub-light sources cooperate with each other to display timing progress of different colors through the visual display zone in a manner that when one of the sub-light sources is turned on, the visual display zone displays the color of the sub-light source, when another sub-light source is turned on, the visual display zone displays the color of another sub-light source, and when two sub-light sources are turned on, the color mixed by the two sub-light sources is displayed;

wherein the visual indicator assembly comprises a light diffusion layer in a sheet shape, the light diffusion layer comprising a plurality of separated visual zone diffusion regions, the separated visual zone diffusion regions are evenly arranged in a circle, when a pre-set time decreases, numbers of the visual zone diffusion regions with the color representing a remaining time of the pre-set time; and the numbers of the visual zone diffusion regions with the color corresponding to the digital timing time of digital display zone;

wherein the visual indicator assembly further comprises a visual indicator member, the visual indicator member comprises a frame, the frame has a digital zone aperture corresponding to the digital display element and a visual zone aperture corresponding to the visual display element, the light diffusion layer is arranged at one side of the frame away from the digital display element and the visual display element, the light diffusion layer further comprises a digital zone diffusion region corresponding to the digital zone aperture, the visual zone diffusion regions corresponding to the visual zone aperture, and a light blocking area surrounding the digital zone diffusion region and the visual zone diffusion regions.

2. The timer according to claim 1, wherein a plurality of the visual zone apertures are also provided, each of the first light-emitting elements is arranged corresponding to one of the visual zone apertures, and each of the visual zone diffusion regions is also arranged corresponding to one of the visual zone apertures.

3. The timer according to claim 2, wherein a plurality of the first light-emitting elements are arranged around the digital display element; the digital display element comprises a plurality of second light-emitting elements, the plurality of second light-emitting elements are configured to display timing numbers through a digital display aperture and the digital zone diffusion region; each of the first light-emitting elements comprises at least two sub-light sources of different colors, and each of the sub-light sources is electrically connected to one corresponding switch element, so that the turn-on and turn-off of the sub-light sources are independently controlled; the timer further comprises a control circuit board, the control circuit board is electrically connected to each sub-light source of the first light-emitting element, so that a brightness of each sub-light source is independently adjusted; and the first light-emitting elements and the second light-emitting elements are both arranged on the control circuit board.

4. The timer according to claim 3, wherein the control circuit board is further configured to control the on/off and/or the brightness of at least two different colored sub-light sources of each of the first light-emitting elements, such that the on/off or color of the plurality of light-emitting elements gradually changes with the decrease of the timing time, thereby allowing the visual display element to display timing progress of different quantities, and/or colors.

5. The timer according to claim 3, wherein the frame comprises a mounting groove, the digital zone aperture and the visual zone aperture penetrate through a bottom of the mounting groove, the light diffusion layer is arranged in the mounting groove, the housing comprises a bottom housing and a light-transmitting cover plate, the light-transmitting cover plate is arranged in the mounting groove and positioned at one side of the light diffusion layer far away from the digital display aperture, the bottom housing is arranged at one side of the visual indicator assembly far away from the light diffusion layer, and the digital display element and the visual display element are positioned in a cavity surrounded by the bottom housing and the visual indicator assembly.

6. The timer according to claim 5, wherein the timer further comprises a control assembly, the control assembly is configured to control the on/off, brightness, timing time, volume, and/or music of the timer; the control assembly comprises a control member, the control member is electrically connected to the control circuit board, and the control member comprises a stepless adjusting member, and the stepless adjusting member is configured for a user to perform a first operation to set different timing times; the stepless adjusting member is a knob encoder, and the first operation comprises a rotation operation; the stepless adjusting member is also configured for the user to perform a second operation to determine the setting, start and/or stop the timing, and the second operation comprises a pressing operation.

7. The timer according to claim 6, wherein the stepless adjusting member comprises a main body part electrically connected to the control circuit board and a knob part connected to the main body part, the bottom housing is provided with an opening, the knob part is mounted on the opening, and the control member further comprises a stepless adjusting member protection cover, and the stepless adjusting member protection cover is sleeved on the knob part.

8. The timer according to claim 1, wherein the timer further comprises a control assembly, the control assembly comprises a brightness adjusting member, the brightness adjusting member is arranged on the housing, and the brightness adjusting member is electrically connected to a control circuit board and is configured for being operated by a user to send a brightness adjusting signal to the control circuit board, so that the control circuit board adjusts the brightness of the digital display element and/or the visual display element;

the control assembly further comprises a color adjusting member, the color adjusting member is arranged on the housing, and the color adjusting member is electrically connected to the control circuit board and is configured for being operated by a user to send a color adjusting signal to the control circuit board, so that the control circuit board adjusts the color of the digital display element and/or the visual display element;

the control assembly further comprises a volume adjusting member and a loudspeaker, the loudspeaker is configured to emit timing prompt sound under the control of the control circuit board, the volume adjusting member and the loudspeaker are electrically connected to the control circuit board, and the volume adjusting member is configured for being operated by a user to emit a volume adjusting signal to the control circuit board, so that the control circuit board controls the volume of the loudspeaker;

the control assembly further comprises a music selection member, the loudspeaker is further configured to play music under the control of the control circuit board, and the music selection member is configured for being operated by a user to select music data played by the loudspeaker;

the control assembly further comprises a switch member, and the switch member is electrically connected to the control circuit board and configured for being operated by a user to control on/off of the timer;

the timer further comprises a power supply assembly and a charging interface, wherein the power supply assembly is arranged in the housing and is electrically connected to the control circuit board, at least a portion of the charging interface is exposed through the housing and is electrically connected to the control circuit board and is configured to connect an external data line to charge the power supply assembly; and the control assembly is mounted on the housing.

9. A timer, comprising:

a housing;

a visual indicator assembly arranged on the housing and comprising a digital display zone and a visual display zone;

a digital display element arranged on the housing and configured to display digital timing time through the digital display zone; and a visual display element arranged on the housing and comprising a plurality of first light-emitting elements capable of displaying a timing progress of different colors through the visual display zone;

wherein the visual indicator assembly comprises a light diffusion layer in a sheet shape, the light diffusion layer comprising a plurality of separated visual zone diffusion regions, the separated visual zone diffusion regions are evenly arranged in a circle, when a pre-set time decreases, numbers of the visual zone diffusion regions with the color representing a remaining time of the pre-set time; and the numbers of the visual zone diffusion regions with the color corresponding to the digital timing time of digital display zone;

wherein the visual indicator assembly further comprises a visual indicator member, the visual indicator member comprises a frame, the frame has a digital zone aperture corresponding to the digital display element and a visual zone aperture corresponding to the visual display element, the light diffusion layer is arranged at one side of the frame away from the digital display element and the visual display element, the light diffusion layer further comprises a digital zone diffusion region corresponding to the digital zone aperture, the visual zone diffusion regions corresponding to the visual zone aperture, and a light blocking area surrounding the digital zone diffusion region and the visual zone diffusion regions.

10. The timer according to claim 9, further comprising a brightness adjusting member, the brightness adjusting member is arranged on the housing, and the brightness adjusting member is electrically connected to a control circuit board and is configured for being operated by a user to send a brightness adjusting signal to the control circuit board, so that the control circuit board adjusts the brightness of the digital display element and/or the visual display element.

11. The timer according to claim 9, further comprising a color adjusting member, the color adjusting member is arranged on the housing, and the color adjusting member is electrically connected to a control circuit board and is configured for being operated by a user to send a color adjusting signal to the control circuit board, so that the control circuit board adjusts the color of the digital display element and/or the visual display element.

12. The timer according to claim 9, further comprising a volume adjusting member and a loudspeaker, the loudspeaker is configured to emit timing prompt sound under the control of the control circuit board, the volume adjusting member and the loudspeaker are electrically connected to a control circuit board, and the volume adjusting member is configured for being operated by a user to emit a volume adjusting signal to the control circuit board, so that the control circuit board controls the volume of the loudspeaker.

13. The timer according to claim 9, further comprising a music selection member, the loudspeaker is further configured to play music under a control of a control circuit board, and the music selection member is configured for being operated by a user to select music data played by the loudspeaker.

14. The timer according to claim 9, further comprising a switch member, and the switch member is electrically connected to a control circuit board and configured for being operated by a user to control on/off of the timer.

15. The timer according to claim 9, further comprising a power supply assembly and a charging interface, wherein the power supply assembly is arranged in the housing and is electrically connected to a control circuit board, at least a portion of the charging interface is exposed through the housing and is electrically connected to the control circuit board and is configured to connect an external data line to charge the power supply assembly.

16. The timer according to claim 9, wherein the plurality of separated visual zone diffusion regions comprises twelve separated visual zone diffusion regions, when the remaining time is 60 minutes, the twelve visual zone diffusion regions with the color can be seen; when the remaining time is 45 minutes, nine of the visual zone diffusion regions with the color can be seen; when the remaining time is 30 minutes, six of the visual zone diffusion regions with the color can be seen; and when the remaining time is 15 minutes, three of the visual zone diffusion regions with the color can be seen.

17. The timer according to claim 1, wherein the plurality of separated visual zone diffusion regions comprises twelve separated visual zone diffusion regions, when the remaining time is 60 minutes, the twelve visual zone diffusion regions with the color can be seen; when the remaining time is 45 minutes, nine of the visual zone diffusion regions with the color can be seen; when the remaining time is 30 minutes, six of the visual zone diffusion regions with the color can be seen; and when the remaining time is 15 minutes, three of the visual zone diffusion regions with the color can be seen.

18. The timer according to claim 9, wherein the timer further comprises a control assembly, the control assembly is configured to control the on/off, brightness, timing time, volume, and/or music of the timer; the control assembly comprises a control member, the control member is electrically connected to the control circuit board, and the control member comprises a stepless adjusting member, and the stepless adjusting member is configured for a user to perform a first operation to set different timing times; the stepless adjusting member is a knob encoder, and the first operation comprises a rotation operation; the stepless adjusting member is also configured for the user to perform a second operation to determine the setting, start and/or stop the timing, and the second operation comprises a pressing operation; and wherein the stepless adjusting member comprises a main body part electrically connected to the control circuit board and a knob part connected to the main body part, the bottom housing is provided with an opening, the knob part is mounted on the opening, and the control member further comprises a stepless adjusting member protection cover, and the stepless adjusting member protection cover is sleeved on the knob part.

* * * * *